United States Patent [19]
Eke et al.

[11] Patent Number: 4,896,653
[45] Date of Patent: Jan. 30, 1990

[54] COOKING FUEL CAN CLOSURE

[75] Inventors: Alan Eke, Menomonie; Brent English, Eau Claire; Marc Kruger, Wausau; Charles E. Yost, Menomonie, all of Wis.

[73] Assignee: Manufacturing Laboratory, Menomonie, Wis.

[21] Appl. No.: 307,751

[22] Filed: Feb. 8, 1989

[51] Int. Cl.$^4$ .............................................. F23D 3/24
[52] U.S. Cl. ...................................... 126/45; 126/43; 431/320
[58] Field of Search .................... 126/45, 43, 262, 263; 431/320, 298, 324; 229/48 SB

[56] References Cited
U.S. PATENT DOCUMENTS

| | | | |
|---|---|---|---|
| 3,874,365 | 4/1975 | Pava | 126/263 |
| 4,002,235 | 1/1977 | Donnelly | 126/263 |
| 4,529,376 | 7/1985 | Cafolla | 431/320 |
| 4,784,112 | 11/1988 | Hayashi | 126/262 |

FOREIGN PATENT DOCUMENTS 944993 6/1956 Fed. Rep. of Germany .

Primary Examiner—Ira S. Lazarus
Assistant Examiner—Christopher Hayes
Attorney, Agent, or Firm—Cushman, Darby & Cushman

[57] ABSTRACT

A cooking fuel can closure is provided wherein at least one aperture is defined through the upper surface of the can and a peelable seal such as a thin metal foil is secured by, for example, adhesive to the upper surface of the can peripherally of the opening through the can. Further, a plurality of peripheral openings can be defined about a central aperture in the can so as to facilitate flow of oxygen to the burning fuel thereby using less fuel while still obtaining the same or better burn efficiency of the cooking fuel. Finally, a wick element can be provided centrally of the cooking can closure in a concave portion which is peripherally sealed prior to use by a peelable seal so as to prevent leakage therethrough.

9 Claims, 3 Drawing Sheets

COOKING FUEL CAN CLOSURE

BACKGROUND OF THE INVENTION

The present invention relates to cans and, in particular, to a closure top for liquid containing cans such as cans containing cooking fuel which ensures a fluid-tight closure prior to use while providing easy access to the container contents and/or use of the canned fuel system.

As shown in FIG. 1, heretofore, liquid or semi-liquid fuel containing cans 10 such as the cans for cooking fuel sold under the tradename Sterno have been provided with a removable metal plug-like closure 12 inserted into a single, central aperture 14. Other cans 16 have been provided with a wick 18 which extends upwardly from the top of the can as illustrated in FIG. 2, the wick 18 being covered prior to use by a flexible plastic cap 20 which frictionally engages a stem 22 defined about the wick 18 at its juncture with the can 16.

The can closures described above have the deficiency that the seal provided by the metal plug and the seal provided by the plastic wick cap are generally not fluid tight and, accordingly, the liquid or semi-liquid fuel disposed within the can will leak, from the periphery of the opening in the top of the can particularly when the can is tipped or turned upside down during handling. Because the liquid or semi-liquid cooking fuel disposed within these cans is flammable, leaking of the fuel in this manner not only renders that can unsalable but makes the storing of such cans hazardous as the fuel which leaks from the can may be ignited with disastrous results.

It would therefore be desirable to provide a can top closure which provides a fluid-tight seal prior to use and yet is easily opened without requiring tools or an extraordinary amount of strength and agility.

A further deficiency with the can closure described above, particularly that illustrated in FIG. 1 is that the burn efficiency of the same is low and it is not possible to effectively control the heat generated thereby. Indeed, the only manner of varying the heat of such canned fuel is to particularly close the aperture defined through the can closure with the metal plug.

It would therefore be desirable to provide a can top closure which increases the burn efficiency of the canned fuel and/or enables a degree of control over the heat generated thereby.

SUMMARY OF THE INVENTION

It is an object of the present invention to provide a can closure which overcomes the deficiencies of the prior art noted above by providing a peelable fluid-tight seal about the aperture defined through the top of a cooking fuel or similar liquid or semi-liquid containing It is a further object of the present invention to provide a can closure which sealingly encloses the wick of a liquid a semi-liquid fuel containing can so that leakage of the flammable contents prior to use will be prevented.

It is a further object of the present invention to provide a can closure for cooking fuel which improves the burn efficiency of cooking fuel and allows a degree of control over the heat intensity thereof.

These and other objects are realized in accordance with the present invention by providing a cooking fuel containing can with a top closure having at least one aperture defined therethrough and a thin, peelable sheet secured thereto about the outer most periphery of at least one aperture so as to provide a fluid tight seal for at least one aperture. The apertures may be in the form of a central aperture and a plurality of permanently opened peripheral apertures defined about the central aperture or a configuration having a central aperture and a plurality of operable kidney-shaped portions defined peripherally of the central aperture for selectively providing additional openings through the top closure of the fuel can.

The objects of the present invention can further be realized by providing a fuel can top closure as described above wherein a wick element extends through and is secured to a centrally disposed aperture, the top closure of the can having a concave portion in which the central aperture is defined so that a tip of the wick to be ignited is disposed within the concave portion. In that embodiment, the peelable seal is secured to the top closure peripherally of the concave portion so as to provide a fluid tight seal for the wick assembly.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY

PREFERRED EXEMPLARY EMBODIMENTS

As noted above, the prior art cooking fuel cans which contain semi-solid or liquid material therewithin can leak from the periphery of the plug top because a fluid-tight seal between the metal plug closure 12 and the metal can top is difficult to achieve.

Similarly, fluid can leak from the periphery of the prior art wick closure because providing a fluid-tight seal between the flexible wick cap 20 and the wick stem 22 is generally not possible if the cap is to be easily, selectively removable by the consumer.

Figure 1:
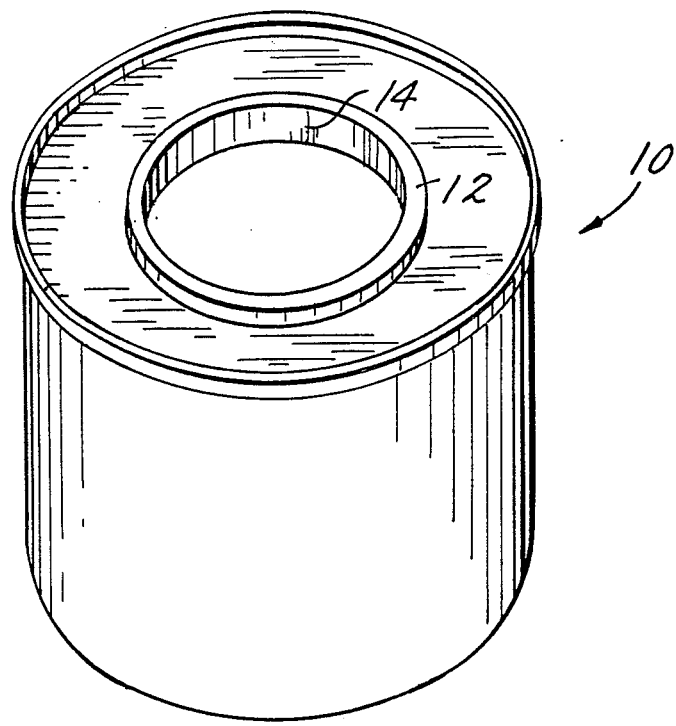
FIG. 1 is an exploded perspective view showing a prior art cooking fuel can.
Figure 2:
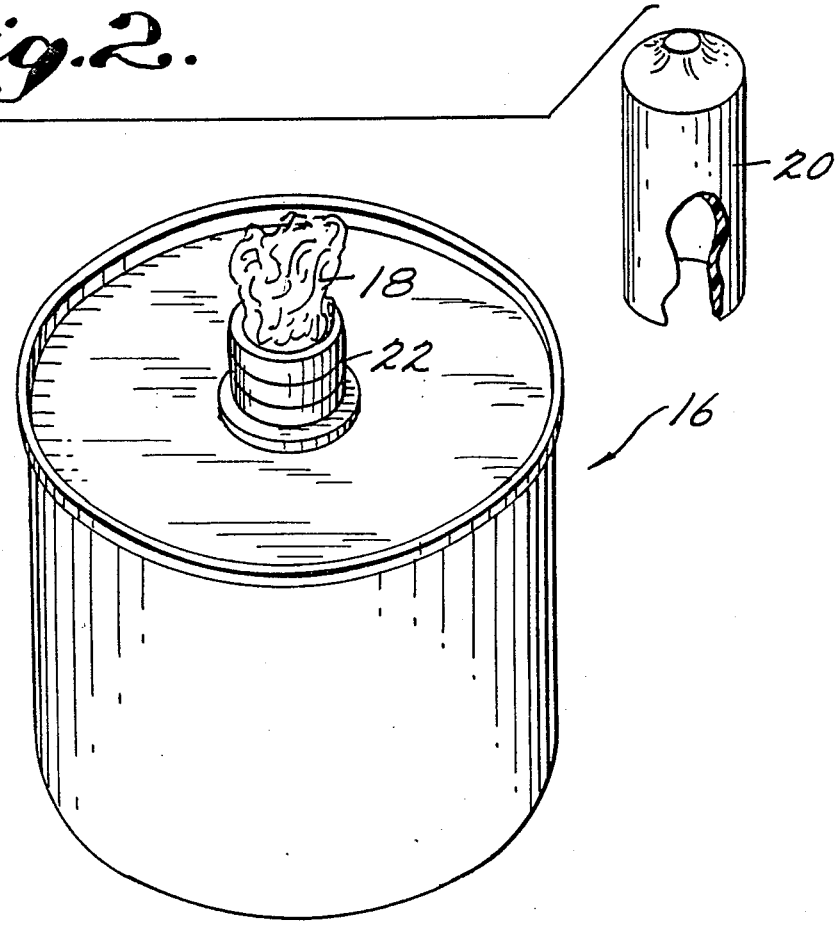
FIG. 2 is an exploded perspective view of another prior art cooking fuel can.
Figure 3:
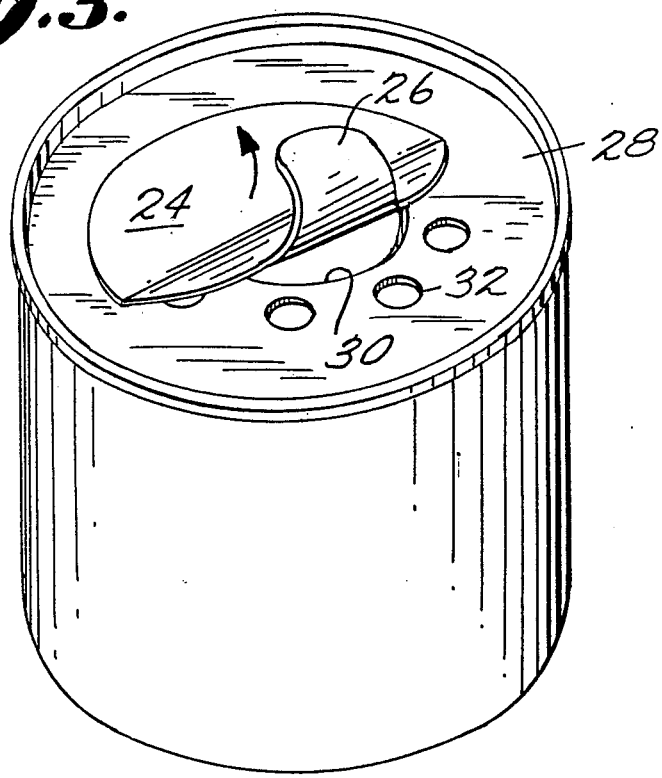
FIG. 3 is a perspective view of a can top closure provided in accordance with the present invention with the peel-back closure partially removed.

Referring to FIG. 3, the present invention overcomes the problems of leakage encountered with the prior art can closures by providing a cooking fuel can closure having at least one aperture therein and a thin, peelable seal 24 adhesively secured to the can top so as to cover and seal the aperture(s) defined therein. At least one pull tab 26 is provided about the periphery of the seal so that the seal can be quickly and easily removed from the can top 28. As shown in FIG. 3, a single seal can be provided to seal all the apertures defined through the can top. In the alternative, a peelable seal can be provided for each aperture so that the peripheral openings can be selectively opened as desired.

The pull-top seal 24 itself is preferably formed from a thin metal foil, for example, an aluminum foil, which is then secured to the can top 28. While it is preferred that a metal foil be provided for this purpose, it is to be understood that other peelable seals could be provided such as, for example, plastic-coated paper materials, plastic and the like depending upon the material disposed within the can to which the seal is exposed and the seal strength required.

Figure 4:
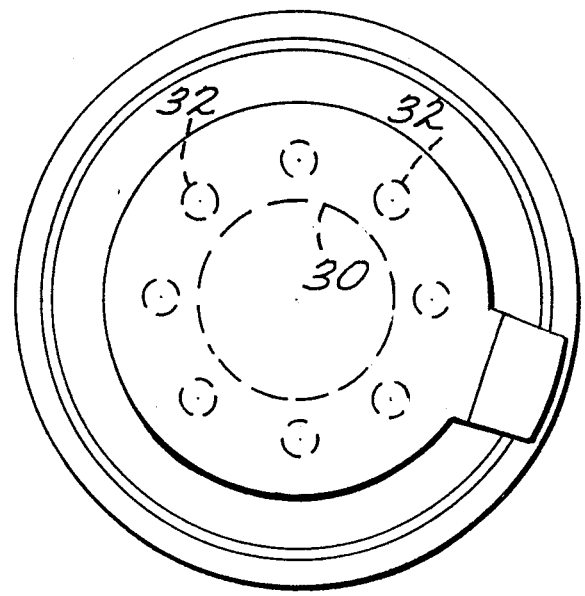
FIG. 4 is a top plan view of a first aperture configuration provided in accordance with the present invention.
Figure 5:
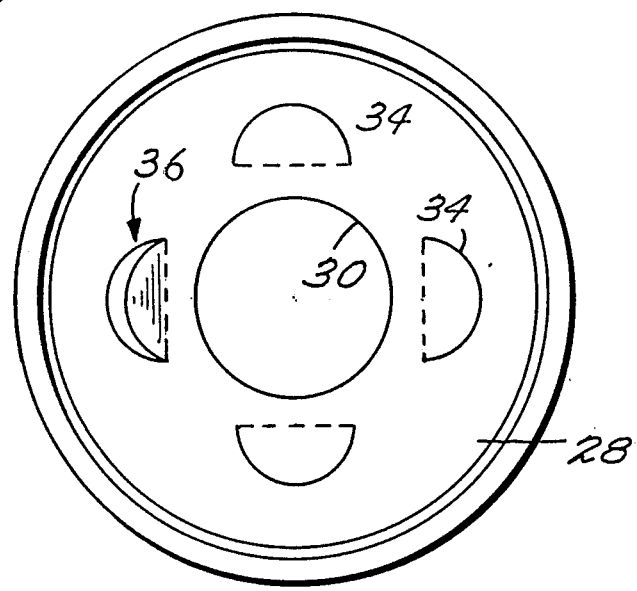
FIG. 5 is a top plan view of an alternate aperture configuration provided in accordance with the present invention.

As can be seen in FIGS. 3–5, in accordance with the present invention, a central aperture 30 is defined in the can closure and a plurality of openings 32 are defined about the central aperture. Such peripheral openings 32 allow oxygen to reach the burning fuel. Thus, less fuel may be used while still obtaining the same or better burn efficiency of the cooking fuel.

In one embodiment the peripheral openings are defined by a plurality of permanently open apertures 32 defined through the can top, about the central aperture (FIG. 4) to facilitate aeration of the cooking fuel and thus increase cooking efficiency and the heat generated by the cooking fuel can.

In an alternate embodiment, shown in FIG. 5 the surrounding openings are in the form of "kidney" shaped slits 34 cut in the top 28 of the can about the central aperture 30. As shown at 36, the "kidneys" can be opened by displacing the central portion of the kidney relative to the cut seam 34. Thus, the heating fuel within the can be ignited, and, if additional heat is required after lighting, one or more kidneys 34 can be punched open so as to provide more oxygen to facilitate efficient burning of the cooking fuel.

In accordance with a further embodiment of the present invention, a wick closure is provided for a cooking fuel can. In the embodiment illustrated in FIG. 6, a concave portion 38 is defined in the fuel can top 40 and a wick 42 is inserted through a central aperture 44 defined through the concave portion 38. In the illustrated embodiment, a metal foil material or the like 46 is wrapped about the wick 42. More particularly, the wick provided in accordance with the present invention is not vertically adjustable. However, providing metal foil material about the wick raises the wick and hence the flame to position the flame properly relative to the bottom of the vessel being heated. Further, the provision of a metal foil material eliminates heat transfer through the wick and thus localizes the heat and the flame at the tip of the wick. Thus, the amount of fuel burned can be limited to the fuel drawn up into the exposed wick portion.

Prior to use, the wick structure is disposed adjacent the concave surface 38 and a peelable seal (not shown in FIG. 6) such as the peelable foil seal 24 shown in FIG. 3 is adhesively secured about the periphery of concave portion 38. Providing such a sealed enclosure, then, will ensure a fluid-tight closure of the container prior to use and thereby prevent leakage of the fuel through the wick 42 or central aperture 44 to the exterior of the can during transport and/or storage. When it is desired to use the canned fuel, however, the peelable seal can simply be pulled off to expose the wick.

Figure 6:
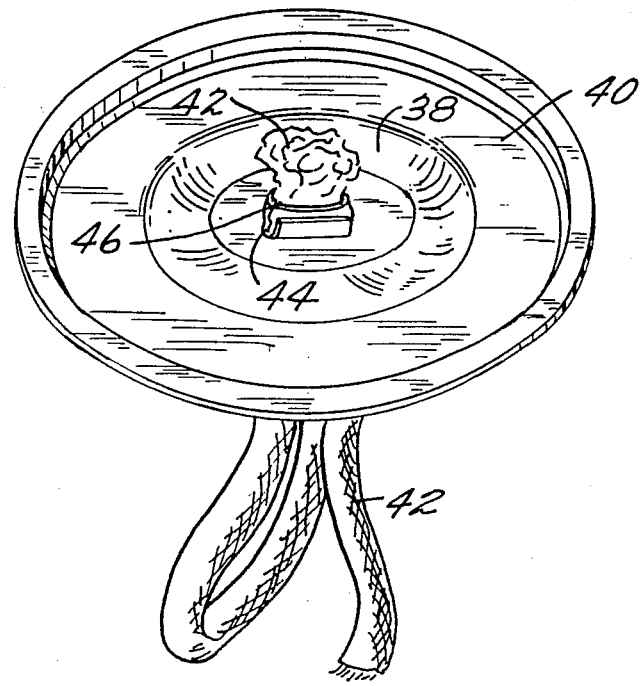
FIG. 6 is a perspective view of a can top closure having a wick provided in accordance with the present invention with the fluid-tight peelable seal removed for clarity.

As is apparent from the foregoing, in order to manufacture the embodiment illustrated in FIG. 6, the end blank is formed and the wick is formed and wrapped with an aluminum tape. The wick is then inserted through the aperture defined in the end blank and the Sealed Safe ® closure is applied while bending the wick over into the depression.

While the invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A cooking fuel can comprising:
   a bottom wall, a side wall, and a top wall closure defining therebetween a cooking fuel receiving chamber, said top wall closure having a central aperture and a plurality of peripheral apertures defined therethrough, said central aperture and said peripheral apertures communicating with said cooking fuel receiving chamber;
   a cooking fuel disposed within said cooking fuel receiving chamber; and
   a peelable sheet-like seal secured to the upper surface of said top wall closure, peripherally of said central aperture so as to define a fluid tight closure for said central aperture.

2. A cooking fuel can as claimed in claim 1, further comprising at least one pull tab defined on the peripheral portion of said peelable seal so as to facilitate removal of said seal and exposure of said central aperture.

3. A cooking fuel can as claimed in claim 1, wherein said peelable seal is formed from a thin metal foil which is adhesively secured to the upper most surface of said top wall closure.

4. A cooking fuel can as claimed in claim 1, wherein said peelable seal covers said central aperture and said peripheral apertures.

5. A cooking fuel can as in claim 1, wherein a peelable seal is provided for each said peripheral aperture.

6. A cooking fuel can as in claim 1, wherein each of said peripheral apertures has a diameter substantially less than a diameter of said central aperture.

7. A cooking fuel can as in claim 1, wherein said at least one peripheral aperture includes a plurality of kidney-shaped slits cut in said top wall peripherally of said central aperture, portions of said top wall closure adjacent said slits being deflectable so as to define peripheral openings.

8. A cooking fuel can as claimed in claim 7, wherein said peelable seal covers said central aperture and said peripheral apertures.

9. A cooking fuel can consisting essentially of:
   a bottom wall, a side wall, and a top wall closure defining therebetween a cooking fuel receiving chamber, said top closure having a central aperture defined therethrough, a concave portion defined centrally of said top wall closure, said central aperture being defined centrally of said concave portion and communicating with said cooking fuel receiving chamber;
   wick means provided through said central aperture for drawing cooking fuel from said cooking fuel receiving chamber up into said concave portion; and
   a peelable sheet-like seal secured to the upper surface of said top wall closure, peripherally of said concave portion, so as to seal said wick means in said concave portion.

* * * * *